(12) United States Patent
Berg et al.

(10) Patent No.: US 11,865,958 B2
(45) Date of Patent: Jan. 9, 2024

(54) STORAGE DEVICE AND VEHICLE

(71) Applicant: Bayerische Motoren Werke Aktiengesellschaft, Munich (DE)

(72) Inventors: Hannes Berg, Munich (DE); Julia Schiller, Eichstaett (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 434 days.

(21) Appl. No.: 17/295,740

(22) PCT Filed: Dec. 11, 2019

(86) PCT No.: PCT/EP2019/084657
§ 371 (c)(1),
(2) Date: May 20, 2021

(87) PCT Pub. No.: WO2020/120581
PCT Pub. Date: Jun. 18, 2020

(65) Prior Publication Data
US 2022/0001784 A1 Jan. 6, 2022

(30) Foreign Application Priority Data
Dec. 13, 2018 (DE) ..................... 10 2018 132 165.1

(51) Int. Cl.
*B60R 3/00* (2006.01)
*B60N 3/00* (2006.01)

(52) U.S. Cl.
CPC ............. *B60N 3/004* (2013.01); *B60N 3/002* (2013.01)

(58) Field of Classification Search
CPC ........ B60N 3/002; B60N 3/004; B60R 5/048; B60R 5/045
See application file for complete search history.

(56) References Cited

U.S. PATENT DOCUMENTS 10,322,656 B2 * 6/2019 Pitcole ................... B60N 3/004
10,981,481 B2 * 4/2021 Becker ............... B60N 2/02246
(Continued)

FOREIGN PATENT DOCUMENTS

DE           696 03 063 T2    12/1999
DE      10 2007 011 055 A1    9/2008
(Continued)

OTHER PUBLICATIONS

International Search Report (PCT/ISA/210) issued in PCT Application No. PCT/EP2019/084657 dated Feb. 21, 2020 with English translation (six (6) pages).

(Continued)

Primary Examiner — Jason S Morrow
(74) Attorney, Agent, or Firm — Crowell & Moring LLP

(57) ABSTRACT

A storage device for a vehicle has a guide unit and a hinge element which can be guided on the guide unit and is moveably guided along the guide unit in a drawer-type manner. The hinge element has a contact surface and two lateral walls at an angle to same. The lateral walls have a plurality of fold regions, such that a first hinge part and a second hinge part are formed between the fold lines in such a way that, in a use position, the storage device forms a stable support for objects and, in the folded state, same can be used for storing the objects.

14 Claims, 8 Drawing Sheets

(56) References Cited

U.S. PATENT DOCUMENTS

| | | | |
|---|---|---|---|
| 11,623,554 B2 * | 4/2023 | Berg | B60N 3/004 |
| | | | 297/146 |
| 2004/0020956 A1 | 2/2004 | Lobanoff | |
| 2018/0177298 A1 * | 6/2018 | Farahani | A47B 23/02 |
| 2022/0048423 A1 * | 2/2022 | Berg | B60N 3/007 |

FOREIGN PATENT DOCUMENTS

| | | | | |
|---|---|---|---|---|
| DE | 102011056355 A1 * | 6/2013 | | B60N 3/004 |
| DE | 10 2012 013 013 A1 | 1/2014 | | |
| DE | 102021114952 A1 * | 12/2022 | | |
| GB | 2538823 A | 11/2016 | | |
| KR | 10-2018-0125913 A | 11/2018 | | |

OTHER PUBLICATIONS

German-language Written Opinion (PCT/ISA/237) issued in PCT Application No. PCT/EP2019/084657 dated Feb. 21, 2020 (five (5) pages).

German-language Search Report issued in German Application No. 10 2018 132 165.1 dated Aug. 19, 2019 with partial English translation (11 pages).

\* cited by examiner

STORAGE DEVICE AND VEHICLE

BACKGROUND AND SUMMARY OF THE INVENTION

The invention relates to a storage device for a vehicle. Furthermore, the invention relates to a vehicle with at least one vehicle interior component, which is arranged in a passenger compartment, and with at least one storage device which is arranged on the vehicle interior component for temporarily depositing and storing at least one object.

In their passenger interior compartments, vehicles have various storage possibilities for temporarily depositing and storing objects. For example, there can be storage compartments which can be locked or cannot be locked, pockets which can be expanded elastically, or drawers. It is known, for example, for at least one storage possibility, for example in the form of a cup holder, to be provided on the center console.

It is a disadvantage of conventional storage possibilities, however, that objects which are stored therein, such as a smartphone, a key, sunglasses or the like, slip within the storage possibility during driving of the vehicle, as a result of which disruptive noise is produced and the object and/or the storage possibility can be damaged. In addition, the conventional storage possibilities are usually of relatively complex design. Furthermore, conventional storage possibilities are frequently configured and arranged in such a way that the driver of the vehicle cannot completely examine and reach the storage space which is provided by way of the storage possibility.

One solution to these problems might be the creation of a storage possibility in the form of a drawer. To this end, however, pronounced encroaching into the installation space of the respective vehicle interior component which receives the storage possibility, for example the instrument panel or the center console, might occur, which usually cannot be realized on account of other installation space requirements.

It is an object of the invention to provide an installation space-saving storage possibility for objects to be stored.

This object is achieved by way of the independent patent claims. Advantageous refinements are described in the dependent patent claims, the following description and the figures, it being possible for these refinements, in each case per se or in different combinations of at least two of these refinements with one another, to represent a developing or advantageous aspect of the invention.

The object is therefore achieved by way of a storage device for a vehicle. This storage device comprises at least one guide unit which can be arranged on a vehicle interior component. The guide unit can in turn consist of a plurality of components, and particularly advantageously has a rail. Moreover, the storage device comprises at least one hinge element which can be guided on the guide unit and is guided along the guide unit such that it can be displaced in a drawer-like manner on a curved or angled-away movement path. The hinge element has a rest face and two side walls which are angled away with respect thereto. In particular, each side wall is guided in a dedicated guide unit. It is provided that the hinge element can be transferred between a storage position and a rest position. In the rest position, it is provided, in particular, that the hinge element has left the guide unit at least partially. In the rest position, a user can rest objects on the rest face, whereas the hinge element increases the freedom of movement of the user in the storage position.

The side wall comprises a first end and a second end. At the first end, the side wall bears against the rest face. The second end lies opposite the first end. It is provided here that the side wall has a multiplicity of folding regions which comprise a first folding line, a second folding line and a third folding line. The first folding line is placed between the second folding line and the third folding line, with the result that a first hinge part is formed between the first folding line and the second folding line, and a second hinge part is formed between the first folding line and the third folding line. Furthermore, it is provided that the second folding line and the third folding line are of non-parallel configuration with respect to one another, and a first spacing between the second folding line and the third folding line at the first end is smaller than a second spacing between the second folding line and the third folding line at the second end. This achieves a situation where, in the case of folding in of the folding region, the first hinge part and the second hinge part form either a peak or a trough. Since the first spacing at the first end is different than the second spacing at the second end, the side wall is shortened by way of folding in of the folding region at the second end to a more pronounced extent than at the first end. This therefore makes it possible that the side wall can be moved together with the rest face along a curved path. Secondly, each folding region can also be blocked, with the result that the side wall acts as a reinforcement of the rest face, and the rest face is therefore provided as a rigid surface which can serve as a shelf or as a table surface.

Furthermore, it is provided that a lever element is attached on each first folding line. It is provided here that lever elements of this type which are attached on opposite first folding lines of the side walls are connected via in each case one central joint. Therefore, the lever elements extend, in particular, in a region below the rest face. Since the lever elements are coupled directly to the first folding line, folding in or unfolding of the folding regions can be forced by way of a movement of the lever elements, in particular by way of a rotation. It is provided that it is possible for each central joint to be displaced toward the rest face and away from the rest face by way of the guide unit, in order to transfer the first hinge part and the second hinge part selectively into a state which is folded into a peak or trough. By way of the displacement of the central joint, it can be achieved that the lever elements are rotated, as described above. Therefore, the guide unit can guide the hinge element along the curved path.

In order to deposit and store an object in the storage device according to the invention, the hinge element is first of all moved from a retracted storage position into an extended rest position, the hinge element being guided positively along a curved or angled-away movement path by means of the guide unit. As a result, in particular, the rest face is exposed and is therefore available for storing at least one object. In its extended rest position, the rest element forms, as it were, a table. To this end, the hinge element leaves the guide element at least in regions. The hinge element can be moved from its rest position into its storage position again, the hinge element again being guided positively along the curved or angled-away movement path by means of the guide unit. The hinge element can remain in its storage position until the next use of the storage device, in order not to unnecessarily restrict the passenger interior compartment of the vehicle. The actuation of the storage device according to the invention can take place in a simple way by way of a single hand.

The guide unit is preferably attached in a stationary manner on a vehicle interior component, that is to say a vehicle component which is arranged in the passenger interior compartment. To this end, a corresponding installation space or movement shaft is to be provided on the passenger interior component.

The hinge element can provide a relatively large rest face which can be examined and reached satisfactorily in comparison with conventional storage possibilities, such as, for example, a cup holder. The rest element can be moved to and fro between the storage position and the rest position via a manual actuation or in an automated manner via a motorized actuation. The respective trapezoidal wall element of the respective side wall is connected to the base of the trapezium, that is to say the base side of the side wall, to the web of the rest element or the web section of the respective member.

It is preferably provided that the second folding line and the third folding line are arranged symmetrically with respect to the first folding line. Therefore, in particular, the first hinge part is the same size as the second hinge part. This simplifies the kinematics of folding in and unfolding. Therefore, in particular, a simple and reliable transfer of the storage device between the storage position and the rest position is achieved.

The first folding line, the second folding line and the third folding line advantageously meet one another at the first end. As a result, the hinge parts are of triangular configuration. This in turn simplifies the kinematics of folding in and unfolding. Moreover, a length change between the first end and the second end is maximized, since no length change takes place at the first end, whereas the second end is shortened by the spacing between the second folding line and the third folding line in the case of folding in of the folding region. Therefore, in particular, the rest face which is present at the first end is not impaired during folding; rather, it is merely curved along the curved movement path.

In one preferred embodiment, both the first hinge part and the second hinge part are configured in such a way that they have the shape of a right-angled triangle. As an alternative or in addition, it is preferably provided that the second folding line and the third folding line form an equilateral triangle together with a part region of the second end. In this way, kinematics of the fold are once again simplified, and an operating capability of the storage device is made possible in a manner which is simple and low in complexity, but at the same time is secure and reliable.

The lever elements are preferably configured in such a way that the folding regions have a maximum fold when the lever elements are at a minimum spacing from the rest face. In this case, the lever elements can be moved, in particular, in such a way that lever elements which lie opposite one another and are connected via a central joint form a straight line when there is a minimum fold. In this case, the lever elements are advantageously of self-blocking arrangement, and thus make a reinforcement of the hinge element possible. In order to move the hinge element along the curved path, the central joints have to be displaced, in order, as described above, to achieve the maximum fold. For a user, the hinge parts therefore form a trough during folding. It is provided in one alternative that the folding regions have a minimum fold or no fold when the lever elements are at a minimum spacing from the rest face. In this case, the folding regions can be folded by virtue of the fact that the central joints are displaced away from the rest face, in particular into a state in which the lever elements which are connected via a central joint form a straight line. From the viewpoint of a user, a fold is then effected toward the outside, with the result that the hinge elements form a peak.

The lever elements advantageously comprise end faces which can be pressed onto one another by the central joint. In this way, a further movement of the lever elements in at least one direction is blocked. In particular, the pressing onto one another takes place by way of a movement of the central joint away from the rest face, with the result that, in particular in the above-described first alternative, a reinforcement of the hinge element is achieved. This reinforcement accompanies a blockage of the lever elements on account of the side faces being pressed onto one another, with the result that the hinge element maintains the reinforced state without external influences. In this way, the hinge element can leave the guide unit without the reinforced state being abandoned.

As an alternative or in addition, the lever elements can preferably be latched on a part region of the hinge element, in order to block a movement of the lever elements in at least one direction. This is advantageous, in particular, in the above-described second alternative, in which the lever elements which are connected via a central joint have a kink with respect to one another when the folding regions are not folded or are folded merely to a minimum extent. In this case, in particular, there is a minimum spacing between the rest face and the central joint. If the central joint and/or the associated lever elements is/are latched in this position, a situation is in turn achieved where the hinge element maintains its reinforced state automatically. In this way, the hinge element can leave the guide unit without the reinforced state being abandoned.

The side walls are particularly advantageously configured in parallel with one another. Here, it is provided, in particular, that the side walls form a U-shape with the rest face. In this way, in particular, a best possible reinforcement of the rest face in the rest position is made possible. Moreover, the rest face can be extended beyond a side wall or both side walls. This can be realized in one piece by way of an enlarged configuration of the rest face or by way of the application of an additional element to the rest face.

The storage device preferably has at least two hinge elements which are arranged in parallel. The rest faces of the hinge elements are connected, in particular, to a rest part. The rest part can be provided at least partially with a friction-increasing surface. In this way, a drawer-like system is achieved which, in particular on its edge regions, has hinge elements which make a movement along a curved path possible.

The first hinge part and the second hinge part can preferably be latched, in order to prevent folding of the folding region. As a result, it is possible that that section of the rest element which has been pulled or extended in an automated manner out of the vehicle interior component is reinforced on account of the latching action, in order for it to be possible for an object to be deposited on it. In the case of the movement of the rest element into its rest position, the latching actions are automatically released progressively or one after another, in order to make folding of the corresponding folding region possible. This takes place, in particular, by way of the lever elements which are guided in the guide unit.

In accordance with a further advantageous refinement, the storage device has at least one covering element which is arranged on the rest face of the hinge element, and at least one winding device which can be arranged in a stationary manner for winding/unwinding the covering element, which winding device defines a winding axis which is oriented transversely with respect to a displacement direction of the hinge element, the covering element being of elastic configuration, a free end section of the covering element, which free end section is arranged so as to face away from the winding device, being fixed on an end section of the rest face, which end section lies opposite a rest end section of the rest face for placing at least one object on the extended rest element, and the guide unit being configured and being arranged relative to the winding device in such a way that the rest end section of the rest face can be moved away from the winding device by a predefined extent. If there is a plurality of hinge elements, it is preferably provided that the covering element is arranged on the rest part which connects the rest faces of the hinge elements.

In order to deposit and store an object in the storage device according to this refinement, the hinge element is first of all moved from a retracted storage position into an extended rest position, the hinge element being positively guided along the curved or angled-away movement path by means of the guide unit. Here, the covering element is moved together with the rest element on account of it being fixed on the rest element, and is wound up by the winding device in the process. By way of the movement of the hinge element from its storage position into its rest position, the rest end section of the rest face is moved away from the winding device by the predefined extent, with the result that the rest face or the rest part is exposed and is available for the placing of at least one object.

After the object has been placed onto the rest face or the rest part, the hinge element can be moved again from its rest position into its storage position, the hinge element again being positively guided by means of the guide unit. Here, the covering element is moved together with the rest element on account of it being fixed on the rest element, and is unwound from the winding device in the process. In addition, the object is moved together with the rest element and, after passing the winding device, is received between the rest element and the covering element and is moved further here together with the rest element until the rest element has reached its storage position.

By way of the receiving of the object between the rest face or rest part and the covering element, the covering element is deformed elastically, as a result of which the object is clamped in between the rest element and the covering element. As a result, it can be reliably prevented that the object slips within the storage device during driving of the vehicle. Therefore, a disruptive development of noise which is due to slipping of this type and damage caused by way of slipping of this type, for example the formation of scratches and the like, can be reliably prevented on the object and the storage device.

If the object is to be removed again from the storage device, the hinge element is first of all moved from its storage position into its rest position, with the result that the rest side of the rest element and the object which is placed onto it are exposed again. The object can then be removed from the rest face or the rest part. Subsequently, the hinge element can be moved again into its storage position until the next use of the storage device, in order not to unnecessarily restrict the passenger interior compartment of the vehicle. The entire actuation of the storage device according to the invention can take place in a simple way using a single hand.

The covering element can be formed partially or completely, for example, from a monolithic flexible element or a woven fabric. An elastic covering element can be formed partially or completely, for example, from a flat elastomer body or an elastic woven fabric. That side of the covering element which faces the rest face can be provided at least partially with a friction-increasing surface. That free end section of the covering element which is arranged so as to face away from the winding device can be fixed, for example, in an integrally joined manner, by at least one seam or at least one mechanical connecting element on the end section of the rest element.

The winding device can be attached in a stationary manner on the guide unit or the vehicle interior component. The winding unit has at least one winding reel for winding/unwinding the covering element. In addition, the winding device has at least one prestressing element which, during unwinding of the covering element from the winding reel, is tensioned with the generation of a restoring force, the restoring force being used to automatically wind up the covering element onto the winding reel. The winding reel is arranged such that it can be rotated about the winding axis. The winding axis preferably runs perpendicularly with respect to the displacement direction of the rest element.

The folding region is particularly advantageously configured as an integral hinge. In this way, the individual folding lines can be produced simply and inexpensively, as described above. Secure and reliable operation of the storage device is also ensured. The hinge element can also be formed, in particular, from a plurality of links which are connected to one another in an articulated manner. Each link can be of dimensionally stable and/or solid configuration.

In accordance with a further advantageous refinement, the storage device has at least one handle which is fixed on the hinge element. The handle can be configured, for example, as a grip, knob, rail or the like, and serves for manual handling of the storage device.

In accordance with a further advantageous refinement, the storage device has at least one lamp which is arranged on the hinge element. As an alternative, the hinge element can also be configured as a lamp. As a result, for example, the positioning or the edge of the rest section of the rest face can be emphasized visually, in order to allow a person to place an object on the rest face, without high attention of the person being required to this end. As a result, in particular, a driver of the vehicle is distracted as little as possible from the traffic when placing an object on the rest face.

A vehicle according to the invention has at least one vehicle interior component which is arranged in a passenger compartment, and at least one storage device which is arranged on the vehicle interior component for temporarily depositing and storing at least one object, the storage device being configured in accordance with one of the abovementioned refinements or any desired combination of at least two of these refinements with one another. The advantages which are mentioned above in relation to the storage device are associated accordingly with the vehicle. The vehicle can also have two or more corresponding storage devices. In accordance with one advantageous refinement, the vehicle interior component is an instrument panel, a center console or a vehicle seat.

Further details, features and advantages of the invention result from the following description and the figures.

DETAILED DESCRIPTION OF THE DRAWINGS

Figure 1:
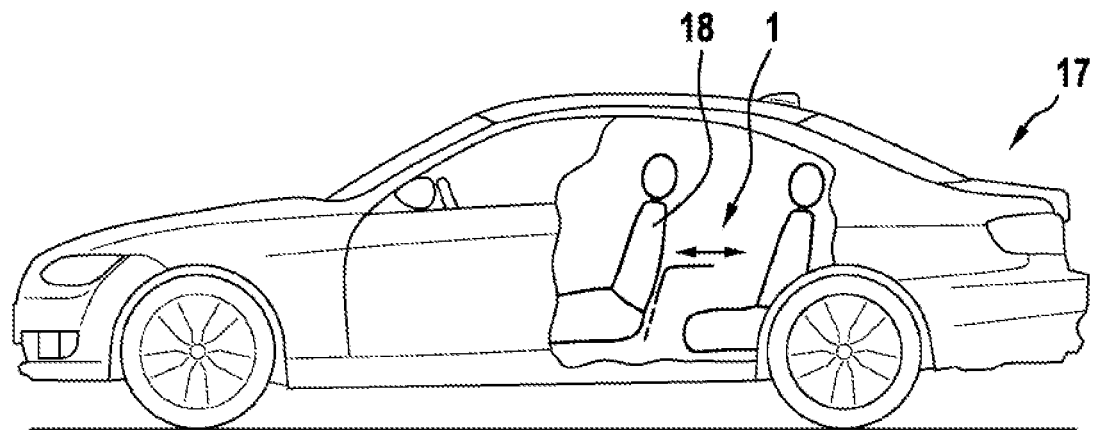
FIG. 1 shows a diagrammatic view of a vehicle in accordance with one exemplary embodiment of the invention.

FIG. 1 diagrammatically shows a vehicle 17 in accordance with one exemplary embodiment of the invention. The vehicle 17 comprises a plurality of vehicle interior components 18, a vehicle seat being shown by way of example in FIG. 1 as a vehicle interior component 18. A storage device 1 in accordance with one exemplary embodiment of the invention is arranged on the vehicle interior component 18.

Here, at least one part of the storage device 1 is guided such that it can be displaced in a drawer-like manner, a curved or angled movement path being provided, in order firstly to realize a table-like rest position, and secondly in order to transfer the storage device 1 into a space-saving storage position.

Figure 2:
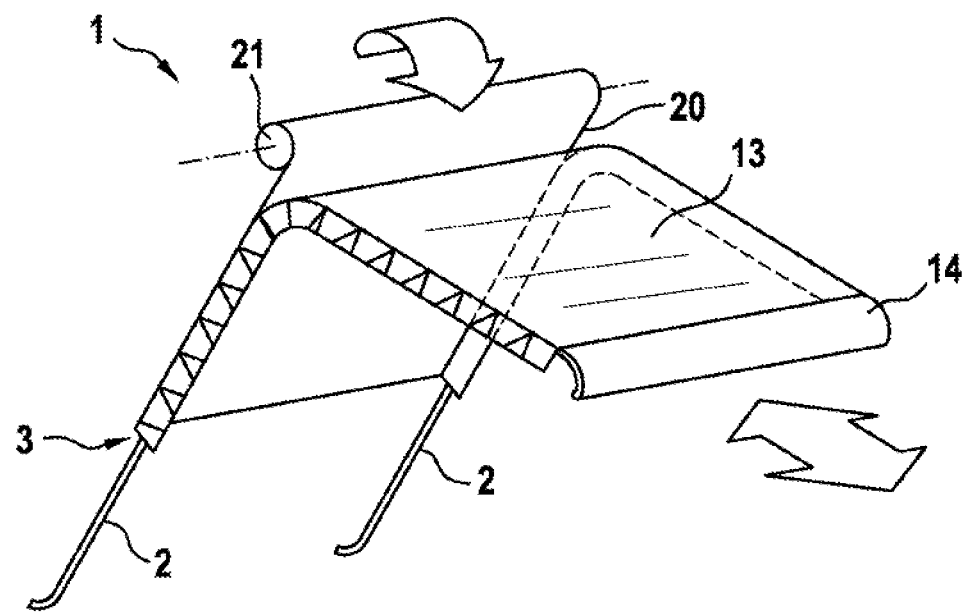
FIG. 2 shows a diagrammatic view of a storage device in accordance with one exemplary embodiment of the invention.

FIG. 2 shows a diagrammatic perspective illustration of the storage device 1 in accordance with one exemplary embodiment of the invention, which storage device 1, as shown in FIG. 1, can be attached to a vehicle interior component 18 of the vehicle 17. In particular, the storage device is transferred at least partially into the rest state.

Figure 3:
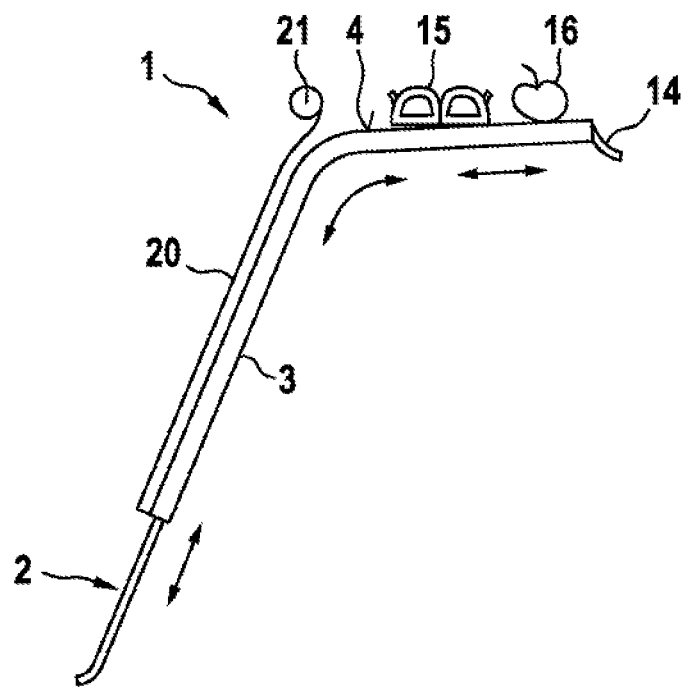
FIG. 3 shows a diagrammatic side view of the storage device in accordance with the exemplary embodiment of the invention, in a partially extended position.
Figure 4:
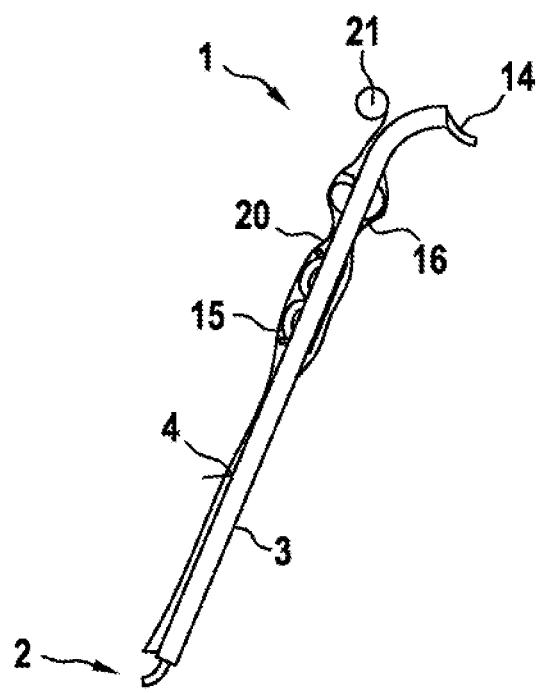
FIG. 4 shows a diagrammatic side view of the storage device in accordance with the exemplary embodiment of the invention, in a retracted position.

FIG. 3 diagrammatically shows a sectional illustration of the storage device 1 as shown in FIG. 2. The storage device 1 is therefore situated at least partially in the rest position. FIG. 4 shows a diagrammatic sectional illustration of the storage device 1 in the storage state. As a result, the storage state arises from the rest state by virtue of the fact that the hinge elements 3 have been moved manually or automatically.

The storage device 1 has a guide unit 2 which can be arranged on the vehicle interior component 18. Two hinge elements 3 of the storage device 1 are arranged on the guide unit 2, which hinge elements 3 are guided by means of the guide unit 2 such that they can be displaced in a drawer-like manner. The two hinge elements 3 are connected to one another via a rest part 13. The rest part 13 serves, in particular, for the user to deposit objects or for use as a table-like support.

Moreover, the storage device 1 comprises a covering element 20 of flexible configuration and a winding device 21 which is arranged in a stationary manner for winding/unwinding the covering element 20. A displacement direction of the hinge elements 3 is indicated by way of double arrows, a winding axis of the winding device 21 being oriented transversely with respect to this displacement direction of the hinge elements 3. The covering element 20 is of elastic configuration. The covering element 20 and the winding device 21 are, in particular, optional, and can be dispensed with.

A free end section of the covering element 20, which free end section is arranged so as to face away from the winding device 21, is fixed on an end section of the rest part 13, which end section of the rest part 13 lies opposite a rest end section (shown on the right in FIG. 3) of the rest part 13 for manual actuation of the rest element 3. A handle 14 is fixed on the rest end section of the rest part 13. The handle 14 serves for manual actuation of the storage device 1. As an alternative, a displacement of the hinge elements 3 with respect to the guide unit can also take place by way of an actuator. In this case, the handle 14 can be dispensed with.

The guide unit 2 is configured and arranged relative to the winding device 21 in such a way that the rest end section of the rest part 3 can be moved away from the winding device 21 by a predefined extent, as shown in FIGS. 2 to 4. As a result, the rest element 3 can be moved into the rest position, with the result that objects, for example glasses 15 and an apple 16, can be deposited on the rest element 3 (cf. FIG. 3). Furthermore, the guide unit 2 is configured in such a way that the hinge elements 3 and therefore the rest part 13 are guided by means of the guide unit 2 such that they can be displaced in a drawer-like manner along an angled-away movement path. As a result, in the case of the exemplary embodiment which is shown, the hinge elements 3 are deflected downward in the case of a movement into its storage position which is shown in FIG. 4.

The guide unit 2 has a dedicated guide device, in particular, on each edge region (not shown) of the hinge elements 3 which exists with regard to the displacement direction of the hinge elements 3. The respective guide device is, in particular, a stationary guide rail, in which parts of the hinge elements 3 are guided displaceably. The guide rails run parallel to one another.

In the storage position of the storage device 1, the covering element 20 has been unwound from the winding device 21. In addition, the objects, for example the glasses 15 and the apple 16, have been received between the rest element 3 and the covering element 20, as a result of which the covering element 20 has been deformed elastically as shown. By way of a reversal of these kinematics, the storage device 1 can be transferred again into its rest state.

The storage device 1 can preferably have at least one lamp (not shown) which is arranged on the hinge elements 3 or the rest part 13. In this way, the hinge elements 3 and the rest part 13 can be recognized rapidly even in the case of darkness. In particular, a current position of the storage device 1 can be detected rapidly and simply.

Figure 5:
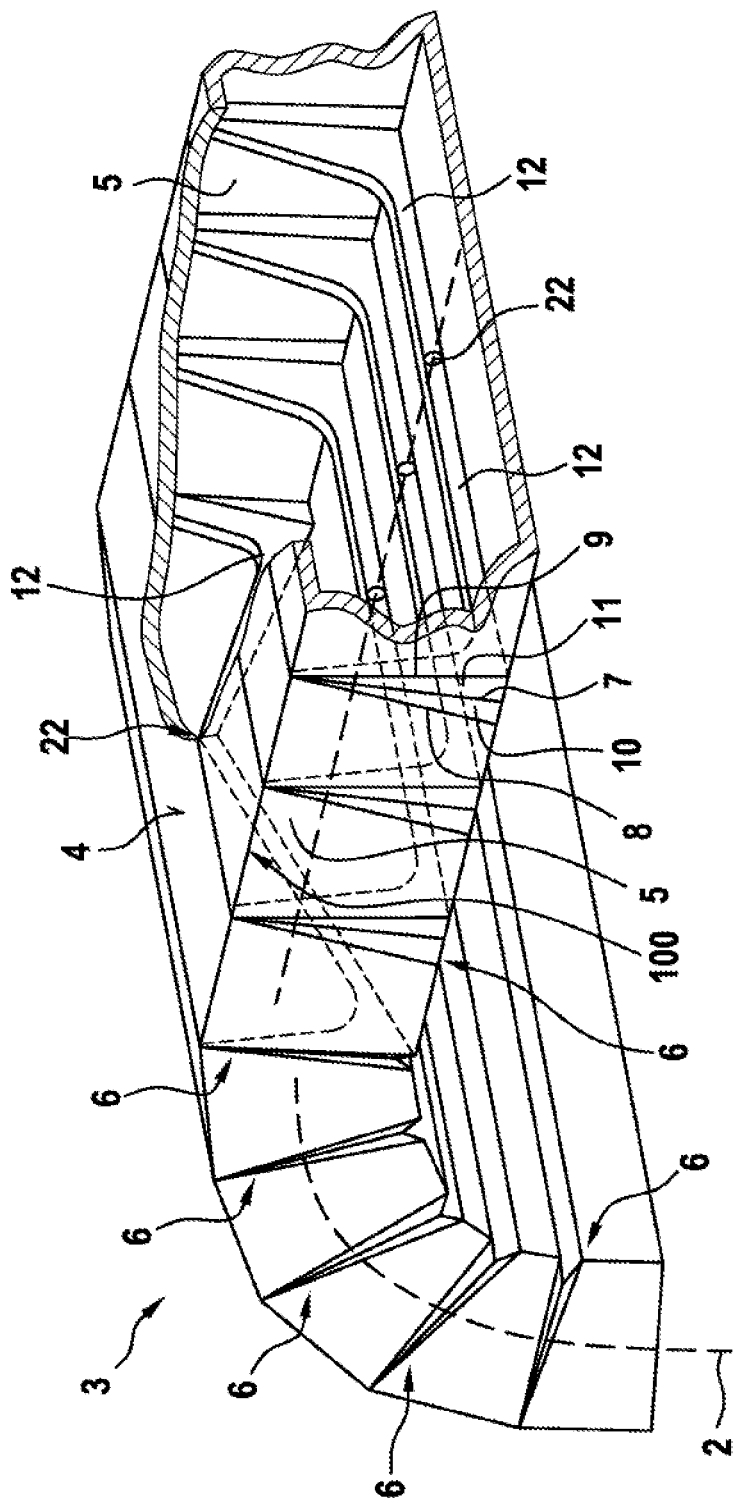
FIG. 5 shows a first diagrammatic illustration of a first alternative of a hinge element of the storage device in accordance with the exemplary embodiment of the invention.
Figure 6:
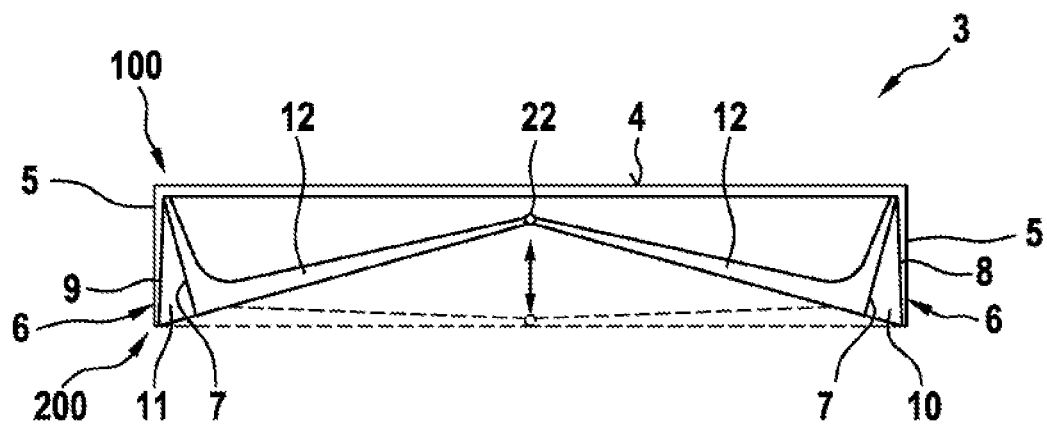
FIG. 6 shows a second diagrammatic illustration of the first alternative of the hinge element of the storage device in accordance with the exemplary embodiment of the invention.

FIG. 5 diagrammatically shows a three-dimensional illustration of a first alternative of one of the hinge elements 3 of the storage device 1. FIG. 6 diagrammatically shows a frontal view of this hinge element. The two hinge elements 3 of the storage device 1 are, in particular, of mirror-inverted configuration.

The hinge element 3 has a U-shaped cross section with a rest face 4 and side walls 5 which extend, in particular, perpendicularly with respect to the rest face 4. The side walls extend in each case between a first end 100, at which the side walls are connected to the rest face 4, and a second end 200 which is a free end. Each side wall 5 has a plurality of folding regions 6 which are arranged in series in the longitudinal direction of the hinge element 3. The folding elements serve to make it possible for the hinge element 3 to be displaced along the curved or angled movement path. In particular, each side wall can be curved or reinforced on the basis of the folding region 6. The latter variant serves, in particular, for use of the storage device as a table-like support.

Each folding region 6 comprises a first folding line 7, a second folding line 8 and a third folding line 9. The first folding line 7 is arranged between the second folding line 8 and the third folding line 9. All of the folding lines 7, 8, 9 extend between the first end 100 and the second end 200. By way of the folding lines 7, 8, 9, the folding region 6 can be folded in such a way that the second end 200 is shortened in comparison with the first end 100. This makes guidance of the hinge element 3 along the curved or angled movement path possible.

In the example which is shown, the first folding line 8 extends perpendicularly with respect to the first end 100 and the second end 200. The second folding line 8 and the third folding line 9 are arranged symmetrically with respect to the first folding line 7, and intersect the first folding line 7 at the first end 100. As a result, a first hinge part 10 and a second hinge part 11 are defined, the first hinge part 10 being configured between the first folding line 7 and the second folding line 8, and the second hinge part 11 being configured between the first folding line 7 and the third folding line 9. Therefore, the hinge parts 10, 11 are of triangular configuration, and are delimited by way of the folding lines 7, 8, 9 and the second end 200. In particular, each hinge part 10, 11 is a right-angled triangle, the entire folding region 6 which is delimited by way of the second end 200, the second folding line 8 and the third folding line 9 forming an equilateral triangle.

The folding regions 6 of the hinge element 3 are formed, in particular, as integral hinges. This makes simple and inexpensive production of the hinge elements 3 possible. In particular, the hinge elements 3 are manufactured from a plastic, for example by way of injection molding.

In order to guide the hinge element 3 along a curved or angled movement path, it is provided that the folding regions 6 are transferred at least partially into a folded state. This means that the first hinge part 10 and the second hinge part 11 are folded to form a peak or to form a trough, the first folding line 7 representing a highest or lowest region in comparison with the side wall 5. By way of the folding, shortening of the second end 200 relative to the first end 100 takes place, as a result of which a curvature of the hinge element 3 is brought about. A curvature radius can be set by way of a degree of the folding.

The folding of the folding regions 6 is forced, in particular, by way of the guide unit 2. Therefore, the guide unit 2 preferably serves firstly to guide the movement of the hinge elements 3, and secondly to fold in and/or fold out the folding regions 6 of the hinge elements 3 and to make the curved or angled movement of the hinge elements 3 possible. In addition, the guide unit 2 can transfer the folding regions 6 into a state which reinforces the side walls 5, with the result that the hinge elements 3 can leave the guide unit 2, in order to serve as a rigid, table-like support.

Lever elements 12 are attached to all first folding lines 7. It is provided here that first folding lines 7 which lie opposite one another of the two parallel side walls 5 have lever elements 12 which are connected to one another. The lever elements 12 are preferably coupled by way of a central joint 22.

The lever elements 12 extend into an interior space of the U-shape of the respective hinge elements 3. If the central joints 22 are displaced relative to the rest face 4, that is to say if a spacing between the central joint 22 and the rest face 4 is changed, folding of the folding regions 6 takes place, in particular. In the first alternative of the hinge elements 3, as shown in FIGS. 5 and 6, a minimum spacing between the rest face 4 and the central joint 22 leads to a maximum fold of the folding region 6, to which the corresponding lever elements 12 are connected. In particular, the associated hinge parts 10, 11 are folded to form a trough.

If the central joints 22 are at a maximum spacing from the rest face 4, the associated folding regions 6 are folded to a minimum extent or are not folded. This means that the folding regions 6 do not bring about any length difference or virtually no length difference between the first end 100 and the second end 200. In particular, moreover, the lever elements 12 are blocked with respect to one another. To this end, end faces 23 of the lever elements 12 abut one another at the central joint 22. It is provided, in particular, that the lever elements 12 can be pivoted in the direction of the rest face 4 by way of the central joint 22. In the direction away from the rest face 4, in contrast, no pivoting or merely minimum pivoting is possible, until the end faces 23 abut one another. As soon as this is the case, the hinge elements 3 are reinforced, since folding of the folding regions 6 is not possible. Therefore, the hinge elements 3 can leave the guide unit 2 as a table-like support.

Figure 8:
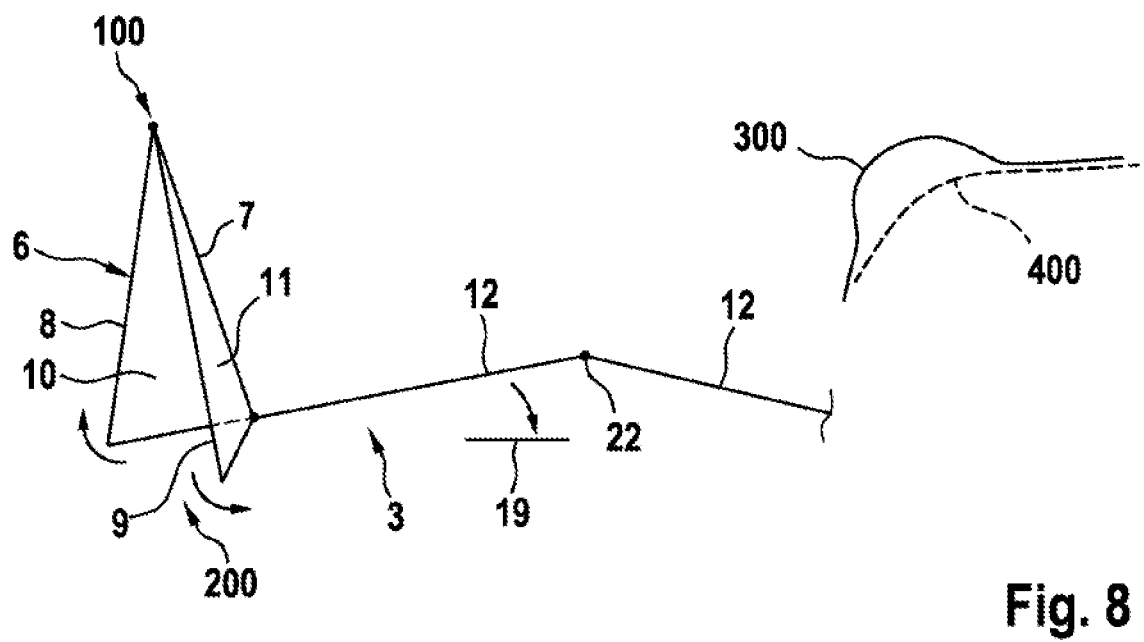
FIG. 8 shows a first diagrammatic illustration of the functional principle of the first alternative of the hinge element in accordance with the exemplary embodiment of the invention.
Figure 9:
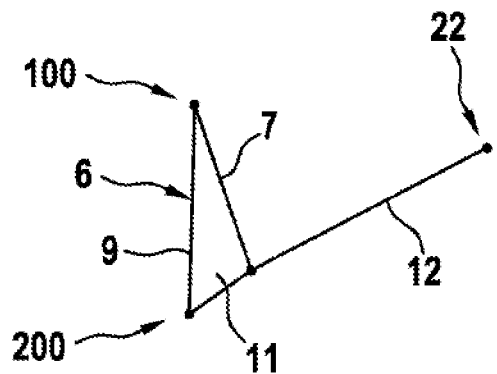
FIG. 9 shows a second diagrammatic illustration of the functional principle of the first alternative of the hinge element in accordance with the exemplary embodiment of the invention.
Figure 10:
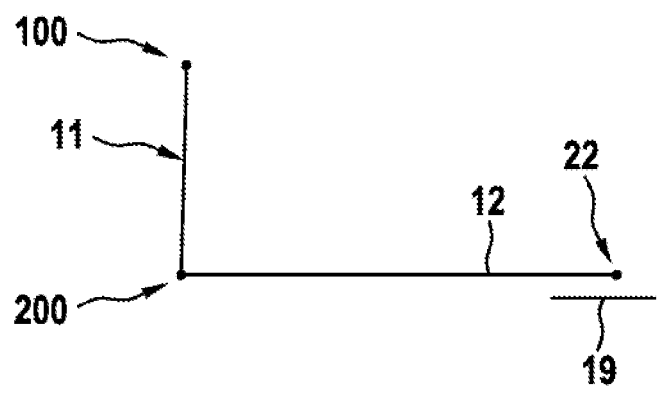
FIG. 10 shows a third diagrammatic illustration of the functional principle of the first alternative of the hinge element in accordance with the exemplary embodiment of the invention.

FIGS. 8 to 10 diagrammatically show an operating principle of the forcing of the folding by way of the lever elements 12. Thus, in particular, FIG. 8 shows that the guide unit 2 brings about different movement paths for the central joints 22 and the second end 200. The central joints 22 are guided on a first movement path 300, whereas the second end 200 is guided on a second movement path 400. This leads to it being possible for the central joints 22 to be displaced relative to the second end 200 and therefore relative to the rest face 4.

As is apparent, in particular, from FIG. 8, the central joints 22 are guided at the same level as the second end 200 as long as no curvature of the hinge elements 3 is required. As a result, the folding regions 6 are preferably not folded. In particular, moreover, the folding regions 6 are reinforced, with the result that the storage device 1 can be used as a table-like support. For reinforcement purposes, the lever elements 12 bear against a stop 19, the stop being formed by way of the end faces 23 of the lever elements 12 themselves. As described above, the end faces 23 of the lever elements 12 can bear against one another, in order to block a further movement of the lever elements 12 and therefore to form the stop 19. This state is shown, in particular, in FIG. 10.

In order to realize the curvature of the hinge elements 3, the first movement path 300 moves away from the second movement path 400, with the result that the central joints 22 are displaced in the direction of the rest face 4. This leads to folding of the folding regions 6, the first hinge part 10 and the second hinge part 11 forming a peak. This makes shortening of the second end 200 relative to the first end 100 and therefore a curvature of the hinge element 3 possible. This state is shown, in particular, in FIG. 9.

After the hinge element 3 is guided around the arcuate movement path section, the first movement path 300 approaches the second movement path 400 again (cf. FIG. 8), as a result of which the central joints 22 are moved away from the rest face 4. As a result, ending of the folding of the folding regions 6 and, in particular, a reinforcement of the hinge elements 3 take place. The hinge elements 3 can therefore leave the guide unit 2 and can remain in a reinforced state.

Figure 7:
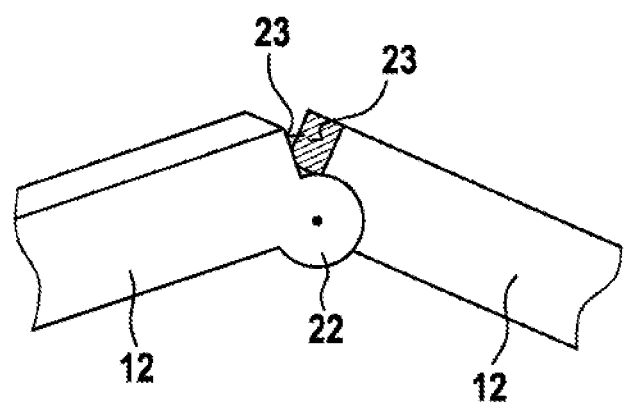
FIG. 7 shows a diagrammatic illustration of a central joint of the first alternative of the hinge element of the storage device in accordance with the exemplary embodiment of the invention.
Figure 11:
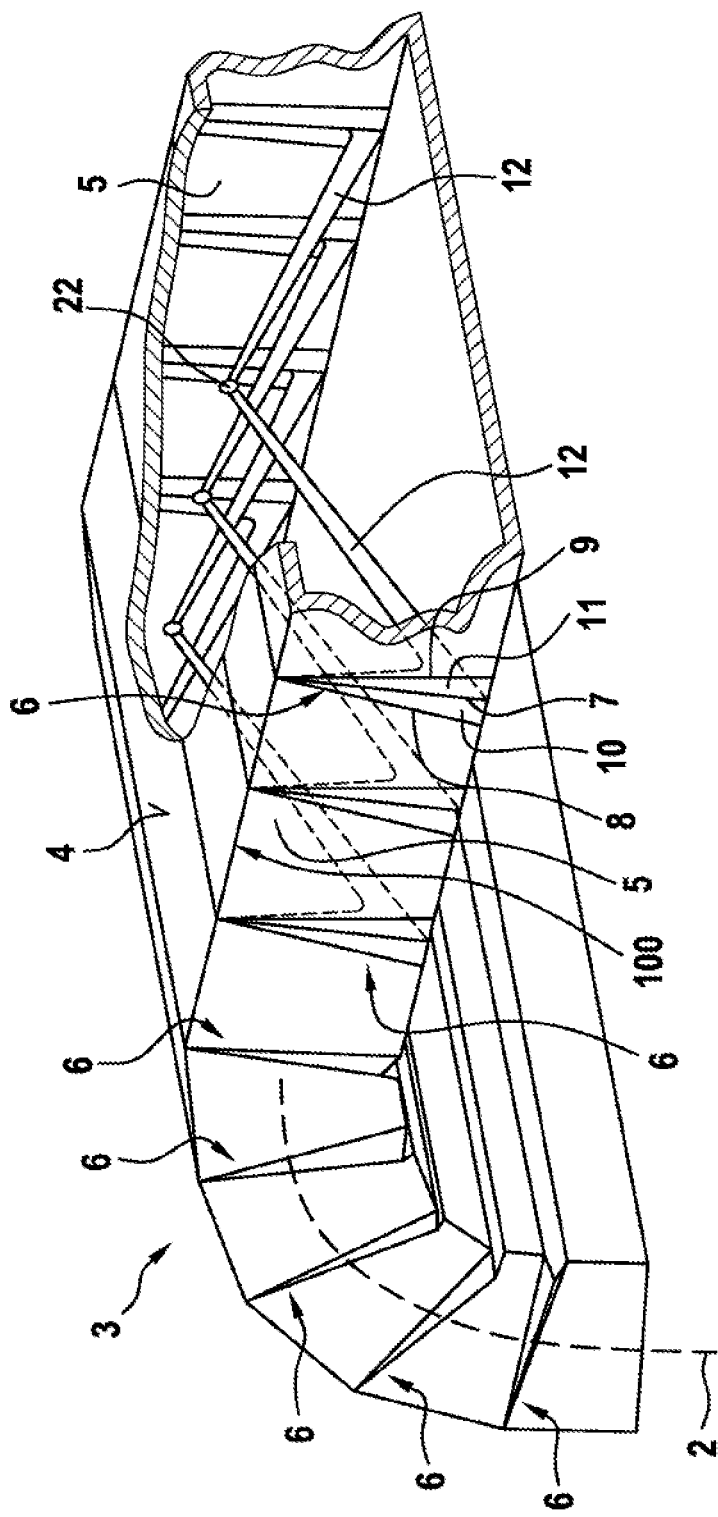
FIG. 11 shows a first diagrammatic illustration of a second alternative of a hinge element of the storage device in accordance with the exemplary embodiment of the invention.
Figure 12:
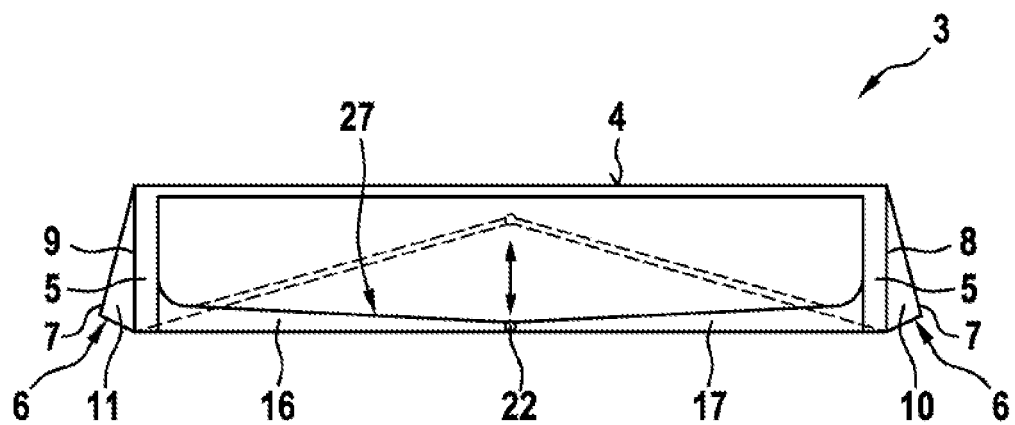
FIG. 12 shows a second diagrammatic illustration of the second alternative of the hinge element of the storage device in accordance with the exemplary embodiment of the invention.
Figure 13:
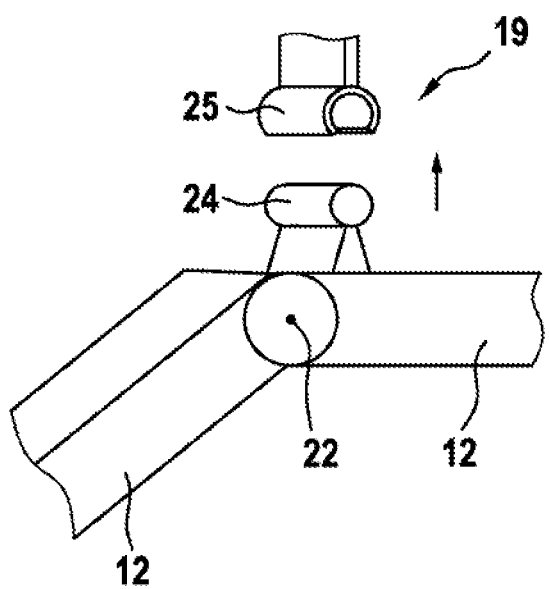
FIG. 13 shows a diagrammatic illustration of a central joint of the second alternative of the hinge element of the storage device in accordance with the exemplary embodiment of the invention.
Figure 14:
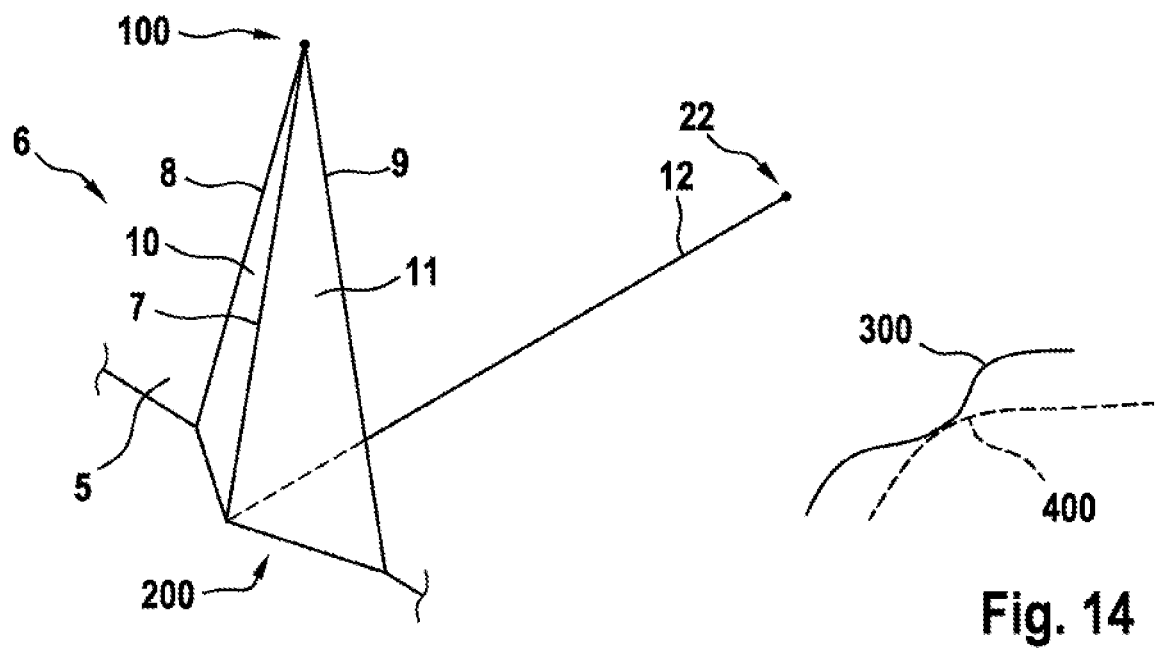
FIG. 14 shows a first diagrammatic illustration of the functional principle of the second alternative of the hinge element in accordance with the exemplary embodiment of the invention.
Figure 15:
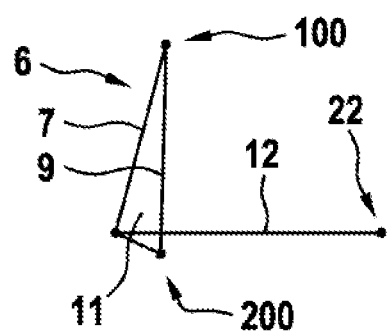
FIG. 15 shows a second diagrammatic illustration of the functional principle of the second alternative of the hinge element in accordance with the exemplary embodiment of the invention.
Figure 16:
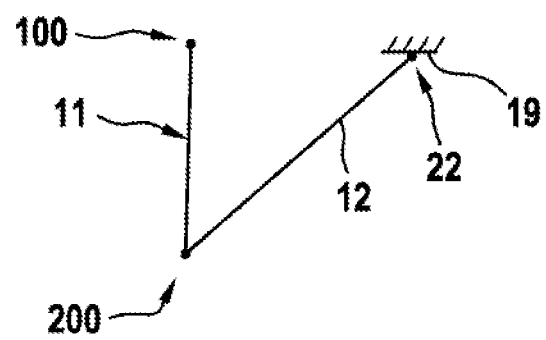
FIG. 16 shows a third diagrammatic illustration of the functional principle of the second alternative of the hinge element in accordance with the exemplary embodiment of the invention.

FIGS. 11 to 16 show a second alternative of the hinge element 3 of the storage device 1 in accordance with the exemplary embodiment. Here, FIGS. 11 and 12 show analogous views to FIGS. 5 and 6. FIG. 13 diagrammatically shows the central joint 22 in an analogous manner with respect to FIG. 7. FIGS. 14 to 16 diagrammatically represent the operating principle, in an analogous manner with respect to FIGS. 8 to 10.

The difference from the first alternative is to be seen merely in the configuration of the lever elements 12 and the central joint 22. Thus, in particular, the lever elements 12 are of longer configuration than in the first alternative, as a result of which, in comparison with the first alternative, the lever elements 12 have different positions for achieving the reinforced state and the folded state.

If the central joints 22 are displaced in the direction of the rest face 4, this brings about unfolding of the folding regions 6, with the result that the folding regions 6 are not folded or are folded merely to a minimum extent. In this state, the central joints 22 can be fixed, as shown, in particular, in FIG. 13. A first locking element 24 is attached to the central joint 22 or to at least one of the lever elements 12, which first locking element 24 can be fixed on a second locking element 25 which is attached to the rest face 4. For example, FIG. 13 shows a clip connection. In this way, the folding regions 6 are reinforced, and the hinge element 3 can leave the guide unit 2 and can serve as a table-like support. A state of this type is shown, in particular, in FIG. 16.

If the central joints 22 are moved away from the rest face 4, the lever elements 12 press the first folding lines 7 to the outside, and therefore bring about folding of the first hinge part 10 and the second hinge part 11 to the outside to form a peak. In this way, shortening of the second end 200 in comparison with the first end 100 takes place, with the result that a curvature of the hinge element 3 takes place. This state is shown, in particular, in FIG. 15. There is therefore a difference with respect to the first alternative in the direction of the folding of the folding region 6, in order to achieve the curved state of the hinge element 3.

FIG. 14 diagrammatically shows a folding region 6 with the associated lever element 12. Moreover, the first movement path 300 of the central joints 22 and the second movement path 400 of the second end are once again shown. In contrast with the first alternative, it is provided in the second alternative that the central joints 22 are at a spacing from the second end 200, as long as no curvature of the hinge element 3 is required. In this state, as described above, a locking action of the central joints 22 on the rest face 4 takes place, in particular. In order to guide the hinge element 3 about a curved or angled movement path, the central joints 22 are to be moved in the direction of the second end 200. This leads to the approach (shown in FIG. 14) of the first movement path 300 and the second movement path 400. As soon as the curvature of the hinge element 3 is no longer required, the first movement path 300 and the second movement path 400 move apart from one another, in order to assume the original spacing. The central joints 22 are then locked, in particular, on the rest face 4 again.

LIST OF DESIGNATIONS

1 Storage device
2 Guide unit
3 Rest element
4 Rest face
5 Side wall
6 Folding region
7 First folding line
8 Second folding line
9 Third folding line
10 First hinge part
11 Second hinge part
12 Lever element
13 Rest part
14 Handle
15 Object (glasses)
16 Object (apple)
17 Vehicle
18 Vehicle interior component
19 Stop
20 Covering element
21 Winding device
22 Central joint
23 End face
24 First locking element
25 Second locking element
100 First end
200 Second end

What is claimed is:

1. A storage device for a vehicle, comprising:
   at least one guide unit which is arrangeable on a vehicle interior component;
   at least one hinge element which is guided on and along the guide unit so as to be displaceable in a drawer-type manner on a curved or angled-away movement path, wherein the hinge element has a rest face and two side walls which are angled away with respect thereto, each of the two side walls have a first end, at which the side wall bears against the rest face, and a second end which lies opposite the first end, each side wall has a multiplicity of folding regions which comprise a first folding line, a second folding line and a third folding line, the first folding line is positioned between the second folding line and the third folding line, with a result that a first hinge part is formed between the first folding line and the second folding line, and a second hinge part is formed between the first folding line and the third folding line, the second folding line and the third folding line are of non-parallel configuration with respect to one another, and a first spacing between the second folding line and the third folding line at the first end is smaller than a second spacing between the second folding line and the third folding line at the second end, a lever element is attached on each first folding line, the lever elements which are attached on opposite first folding lines of the side walls are connected by, in each case, one central joint, and each central joint is configured so as to be displaceable toward the rest face and away from the rest face by way of the guide unit, in order to transfer the first hinge part and the second hinge part selectively into a state which is folded into a peak or a trough.

2. The storage device according to claim 1, wherein the second folding line and the third folding line are arranged symmetrically with respect to the first folding line.

3. The storage device according to claim 1, wherein the first folding line, the second folding line, and the third folding line meet one another at the first end.

4. The storage device according to claim 1, wherein both the first hinge part and the second hinge part have a right-angled triangle-shape.

5. The storage device according to claim 1, wherein the second folding line and the third folding line form an equilateral triangle together with a part region of the second end.

6. The storage device according to claim 1, wherein the lever elements are configured such that the folding regions have a maximum fold when the lever elements are at a minimum spacing from the rest face, or such that the folding regions have a minimum fold or no fold when the lever elements are at a minimum spacing from the rest face.

7. The storage device according to claim 1, wherein the lever elements have end faces which are pressed onto one another by the central joint, in order to block a movement of the lever elements in at least one direction.

8. The storage device according to claim 1, wherein the central joints and/or the lever elements are latched on a part region of the hinge element, in order to block a movement of the lever elements in at least one direction.

9. The storage device according to claim 1, wherein the side walls are configured in parallel with one another and form a U-shape with the rest face.

10. The storage device according to claim 1, wherein at least two hinge elements are arranged in parallel, and the rest faces of the two hinge elements are connected to a rest part.

11. The storage device according to claim 1, further comprising:
at least one covering element of flexible configuration which is arranged on the rest face of the rest element; and
at least one winding device which is arrangeable in a stationary manner for winding/unwinding the covering element, which winding device defines a winding axis oriented transversely with respect to a displacement direction of the rest element, wherein
the covering element is of elastic configuration,
a free end section of the covering element, which free end section is arranged so as to face away from the winding device, is fixed on an end section of the rest element, which end section lies opposite a rest end section of the rest element for placing at least one object on the extended rest element, and
the guide unit is configured and is arranged relative to the winding device such that the rest end section of the rest element is movable away from the winding device by a predefined extent.

12. The storage device according to claim 1, wherein the folding region is configured as an integral hinge.

13. A vehicle, comprising:
at least one vehicle interior component which is arranged in a passenger compartment; and
at least one storage device according to claim 1, wherein the storage device is arranged on the vehicle interior component for temporarily depositing and storing at least one object.

14. The vehicle according to claim 13, wherein the vehicle interior component is an instrument panel, a center console, or a vehicle seat.

* * * * *